United States Patent [19]

Shultz et al.

[11] 4,183,322

[45] Jan. 15, 1980

[54] ABALONE MARICULTURE

[75] Inventors: Fred T. Shultz, Sonoma; George S. Lockwood, Carmel Valley, both of Calif.

[73] Assignee: Monterey Abalone Farms, Monterey, Calif.

[21] Appl. No.: 838,456

[22] Filed: Oct. 3, 1977

[51] Int. Cl.² ............................................. A01K 61/00
[52] U.S. Cl. .................................................... 119/4
[58] Field of Search ................................. 119/4, 2, 3

[56] References Cited

U.S. PATENT DOCUMENTS

| 3,196,833 | 7/1965 | Glancy | 119/4 |
| 3,526,209 | 9/1970 | Budge et al. | 119/4 |

*Primary Examiner*—Hugh R. Chamblee
*Attorney, Agent, or Firm*—Christie, Parker & Hale

[57] ABSTRACT

In a process and apparatus for mariculture of abalone, fertilized abalone eggs are filtered from the environment in which they are spawned and fertilized and placed at controlled density into a constant temperature hatching bath of filtered seawater. The dissolved oxygen content of the hatching bath is maintained above at least about 75% of saturation at the temperature of the water. After the eggs hatch and the larvae have broken away from their respective egg cases, they are transferred free of egg debris to a constant temperature larvae growing bath of filtered seawater for the duration of larval development.

16 Claims, 4 Drawing Figures

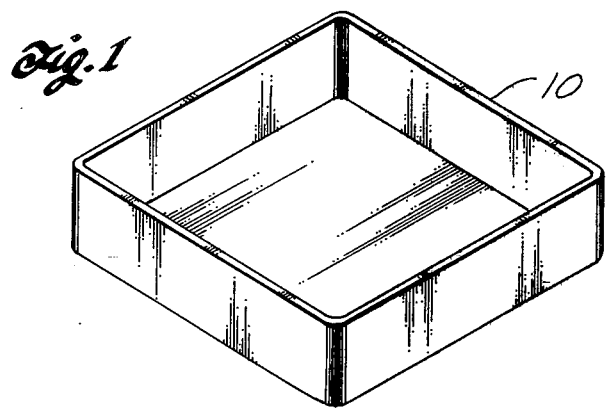
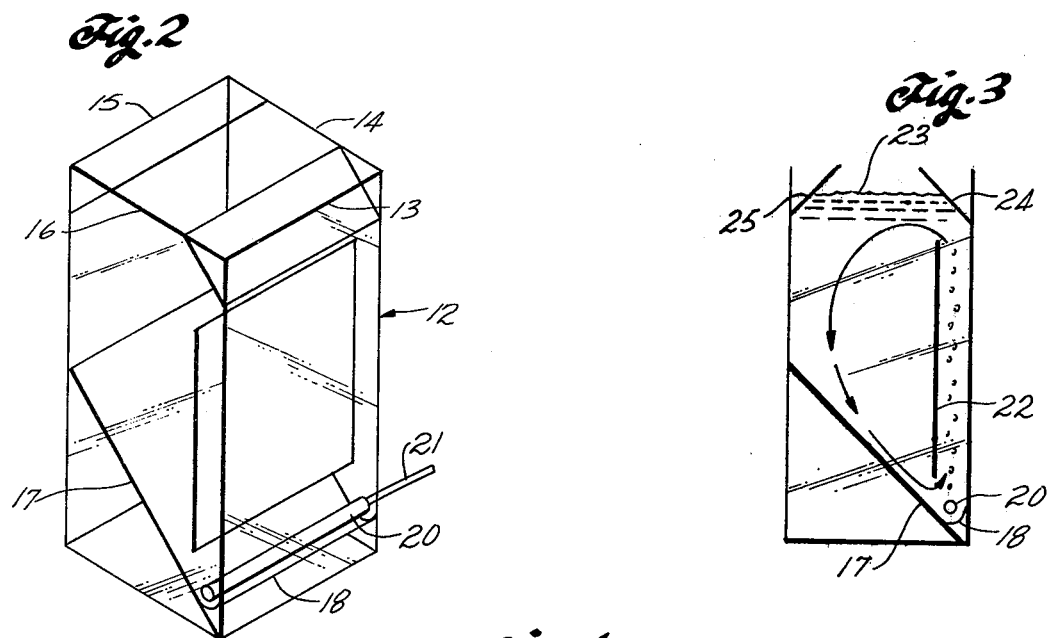
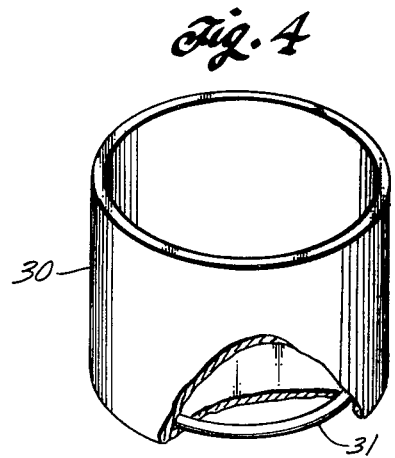

ABALONE MARICULTURE

BACKGROUND OF THE INVENTION

Abalone, in the natural state, are fast being depleted by predators, ocean pollution and commercial harvesting, to the point that there is no longer an adequate supply of this shellfish to satisfy world demand. The price of edible abalone meat has escalated fivefold over the last ten years.

The normal life cycle of an abalone starts with a spawning process involving the dissemination of eggs by the ripe female and a fertilization thereof in the aqueous environment by male sperm. Spawning has been successfully induced in commercial mariculture operations in Japan and in experimental programs in the United States.

The fertilized abalone eggs, which are about 150 microns in diameter, undergo several stages of development in the first 36 hours, and then hatch to become free-swimming larvae. These larvae hatch initially without a protective shell, but within approximately six hours an initial shell is developed. The ability of the larvae to swim is provided by a velum, which includes hundreds of hairlike cilia that are rapidly moved by the animal to propel it through the water. During this larval stage, it is believed that the primary source of nutrition is obtained from the egg yolk still contained within the body of the larva. After approximately four days under controlled conditions, and this time period may vary somewhat in nature, the larvae develop a foot which allows them to settle and then metamorphose from a swimming form into a crawling snail-like animal. The larvae, which are about 150 microns in greatest dimension at the time of hatching, grow to approximately 250 micron size in the four-day period.

When the swimming larvae reach the last stage of development, which, as noted above, occurs in approximately four days, they begin to search for suitable substrate upon which to settle, and metamorphose from a swimming animal to a surface crawling animal. This process of metamorphosis is a very interesting and complicated one, and is described in greater detail in our copending application Ser. No. 955,944, filed Oct. 30, 1978, and entitled Abalone Mariculture.

The fertilized abalone eggs and the larvae hatching therefrom are extremely delicate. In their native environment, a substantial percentage of the eggs do not hatch and a goodly percentage of the hatched larvae do not live through the first four days. With controlled fertilization of good quality eggs, we have been able to achieve a hatchability percentage as high as 90%. Moreover, in artificial culture, if this percentage is significantly below 90%, it is a likely possibility that the resultant larvae are not healthy and will not develop normally. Further, we have been able to obtain a survival rate of such larvae of about 90% through the first four days of their life.

SUMMARY OF THE INVENTION

We have developed a process of abalone mariculture involving the handling and care of fertilized eggs and larvae to optimize the survival of the animals at this stage of their life. The process involves the steps of carefully separating fertilized eggs from the water in which they were spawned and fertilized so as to exclude excess sperm, feces, mucous, and other organic matter, which, during subsequent incubation, represent a dangerous source of bacterial growth and other adverse factors. The carefully separated eggs are next placed in a hatching bath of filtered and ultraviolet sterilized seawater which is held at a constant temperature and in which the dissolved oxygen content is maintained above about 75% of saturation. The eggs are maintained in the hatching bath for the incubation period, and thereafter, until a major portion of the hatched larvae have broken away from their respective residual egg sacs. The larvae are transferred from the hatching bath into a new constant temperature bath of seawater, and, in the process of such transfer, are carefully separated from hatching debris. We have found that the multiple bath technique, which enables the progressive separation of the eggs and larvae from residual matter, greatly increases the survival rate and the general health of the resulting animals.

In the first separation stage, aliquots of the clean, fertilized eggs may be put in shallow trays of filtered seawater, provided that the water is kept at a controlled temperature and the introduction of eggs is in such numbers as to insure that the dissolved oxygen content of the water does not fall below about 75% of saturation. Also, for larger scale operations, we have developed a unique hatching tank in which a very gentle circulation of filtered, controlled temperature seawater is induced by air bubbling so as to permit a much higher density egg population while still maintaining the required oxygen content.

DESCRIPTION OF THE DRAWINGS

FIG. 1 is a perspective view of a hatching tray in which the water is quiescent during the hatching period;

FIG. 2 is a perspective view of a plexiglass incubation tank;

FIG. 3 is a side elevation of the tank of FIG. 2; and

FIG. 4 is a perspective view of a larvae growing tank.

SPECIFIC EMBODIMENT OF THE INVENTION

The successful hatching of large quantities of abalone eggs is a multistage process that involves quality control of the eggs and fertilization by techniques not forming a part of this invention, cleaning of the eggs, and incubation under proper conditions. As soon as the eggs are spawned and fertilized and cell division begins to occur, and, in accordance with our process, the eggs are separated from the contaminated water containing unused sperm, feces, mucous, and other contaminants such as bacteria provided by the parent stock. This is accomplished by a multiple filtration process in which the eggs are removed from the contaminated water and placed into water that has been passed through a two-micron filter and subjected to ultraviolet sterilization.

To effect ultraviolet sterilization, the filtered seawater is passed under commercially available ultraviolet fluorescent lamps (germicidal type) at a distance of approximately ⅛ of an inch away from the lamps. These lamps are operated at approximately ten watts of electrical energy input for each gallon per minute of flow rate. The sterilization units are standard, finding use in aquaculture hatcheries throughout the industry, and, as such, form no part of the present invention. We have established that it is possible to reduce the bacteria count from approximately 10,000 bacteria cells per milliliter to approximately 100 cells per milliliter, it being important in accomplishing this objective to prefilter the water, as described, so as to remove particulate matter which appears to interfere with the efficacy of the ultraviolet sterilization.

It is essential that water with a low bacterial count be used for cleaning the eggs and for incubation, since the developing eggs provide a good bacteria culture substrate, and high bacteria counts will be experienced if contaminated water is used. At the early stages of an abalone's life from fertilized egg to a shelled animal of appreciable size, they are highly vulnerable to destruction by various species of bacteria found in seawater. In their natural habitat, it is believed that only a very few of the millions of spawned eggs survive this early period. It is, of course, the objective of our invention to greatly increase these odds by the controlled procedures described herein.

We have found that the filtration method described herein provides seawater with a bacteria count of 100 cells or less per milliliter, which level is satisfactory.

In the simplest embodiment, the filtered seawater is placed in a tray such as that shown in FIG. 1, the water in the tray being held at a constant temperature selected to maximize the hatching process of the particular species of abalone being raised. In the case of *Haliotis rufescens*, indigenous to California waters, this temperature is selected between 16° and 18° C. Because of the small volume of water in the tray, it is our practice to keep these hatching trays in a constant temperature environment rather than attempt to artificially control the water temperature in each tray.

The fertilized eggs are transferred from the body of water in which they were spawned onto a nylon filter that retains objects of approximately 100 microns or larger. Since well-formed abalone eggs are approximately 150 microns in diameter, they are retained on this filter. The eggs are washed in sterilized water and then passed through a second filter of approximately 300 micron pore size. The eggs pass through this filter while clumps of mucous and other debris remain behind. These two steps are repeated as many as eight times in order to insure that the eggs will be clean and incubated in the required low bacteria count environment.

The tray 10 of FIG. 1 may be of any dimension, but we have found it convenient to use Pyrex glass trays about 8½ inches square and 2½ inches deep, into which the highly filtered and ultraviolet treated seawater is placed. We place not more than ten thousand cleaned eggs in each tray in such a manner that they will settle on the bottom in a uniform scattered pattern, and the trays are then placed in racks in an area controlled to 16° to 18° C. After the eggs have incubated, the resultant larvae are handled as hereinafter described.

An improved apparatus for incubation is the hatching tank illustrated in FIGS. 2 and 3. In these Figures the tank 12 has vertical sidewalls 13, 14, 15, and 16 with an inclined bottom 17 extending from approximately the midpoint of wall 15 to the bottom of wall 13. A fillet 18 contours the junction of the bottom 17 and the wall 13 to eliminate a sharp intersection, which could serve as an unwanted dead spot in the pattern of water circulation within the tank. The tank is conveniently constructed of Lucite, as illustrated, to enable easy observation of the hatching process.

An air diffuser tube 20 is supported in the tank just above the fillet 18 and connected to a source of air under pressure (not shown) by tube 21. The purpose of the air tube is to bubble air gently into the water body in the tank so as to keep the resident eggs in suspension and at the same time to maintain the dissolved oxygen concentration above the desired 75% minimum and preferably close to saturation. To insure a well-organized flow pattern and a minimum possible area of stagnation, we have found it advisable to mount a vertical baffle 22 generally in the position shown spaced closely to and parallel to the long wall 13, terminating above the bottom 17 and below the normal water level in the tank, as illustrated at 23 in FIG. 3. The baffle preferably extends completely between and is attached to walls 14 and 16. Also, removable deflector baffles 24 and 25 may be provided in the vicinity of the water-air interface extending angularly, inwardly from walls 13 and 15 for the same purpose of programming water flow as induced by air dispersal from the air tube 20.

It is important that the eggs suspended in the tank 12 remain in suspension and at the same time be so gently circulated as to avoid bruising, which is generally fatal. To this end, air is bubbled into the tank through the air tube 20 at such a rate as to maintain a water flow velocity in the region between the baffle 22 and adjoining wall 13 of approximately one to one and one-half inches per second.

Because of the circulation in the tank, it is possible to greatly increase the concentration of eggs per liter of water. In a tray of the type shown in FIG. 1, we have found that it is inadvisable to introduce in excess of about 10 eggs per milliliter. We have found, for example, that the survival rate in a tray of this type is often as great as 90%, with an egg concentration as noted. At egg concentrations above about 10 per milliliter, the percentage survival begins to drop off markedly. Not only does the survival rate, percentagewise, drop, but the eggs that do hatch produce weaker larvae and the problem of separating undeveloped eggs from the hatched larvae is greatly complicated.

In a hatching tank of the type illustrated in FIG. 2 of an approximately 16 liter capacity, we are able to introduce 500,000 eggs, representing an egg density of about 35 eggs per milliliter; a significantly greater density than that possible in the trays. Additionally, the tank, as described, is more efficient than the small trays in that it is much easier to set up, maintain and clean.

After approximately 36 hours at 18° C., the eggs begin to hatch. Throughout the incubation period the progress of development can be monitored by a high powered microscope. At the end of the incubation, trochophore larvae can be observed within the egg sac swimming in a rapid, circular gyrating motion, attempting to break out. In due course, the larvae break free from the egg sac and swim to the surface of the water. In the incubation trays this takes place without external assistance. In the tank incubators, it is necessary to turn off the air agitation one or two hours before the larvae break away from the egg case. This is because the young larvae do not possess a shell for the first few hours of their existence and are extremely sensitive to bruising if any agitation exists in the tank during this critical period. In both the tray and the tank method of incubation, the larvae swim to the surface and form swarms in the shape of vertical cyclones two or three inches long. In either case, the egg sacs settle to the bottom away from the larvae. The larvae are then gently removed from the surface of the tank or tray into larvae tanks.

The larvae tank construction is not critical and can consist of anything from a small beaker of perhaps 500 milliliter size to a 1,000 liter tank, the latter being more expeditious in a production operation. To achieve a high larvae stocking density within the larvae tank, it is desirable to impart a general circulating motion to the water in the tank, as, for example, by means of an air wand, to prevent the larvae from settling on the bottom of the tank. A suitable larvae tank is shown in partially cut-away elevation in FIG. 4 in which the tank 30 is a cylindrical, flat-bottomed vessel. An air dispersion tube 31 is mounted adjacent the inside periphery of the tank an inch or two from the bottom. Before introducing larvae into the larvae tank, it is filled with seawater which has been passed through two filters capable of removing objects greater than 25 microns.

It is important for the larvae survival rate not to filter the seawater too finely at this stage nor to subject it to ultraviolet sterilization, since there are biological components within the seawater that appear to be necessary to the successful development of the larvae. We have not yet definitely established the function of these components which remain in water filtered to 25 microns, but they may be involved in maintaining control over the level of ammonia buildup in the tank. Ammonia is one of the principal waste products of larvae as they metabolize their yolk material during their four-day development period, and we have found that it is very important not to allow the ammonia level in the tank to build up in excess of 100 parts per billion. Above this level, substantial mortality of the larvae will result. To insure maintenance of ammonia levels below 100 parts per billion, it is important to treat the seawater used as described and to remove daily from the tank dead animals and other detritus that have settled to the tank bottom. Another method of ammonia control is to continuously change the seawater in the larvae tank with fresh seawater with a low ammonia content. Care must be exercised, however, not to exchange water at too high a rate so that the larvae are physically damaged by the flowing water.

Larvae are carefully removed from the incubation tank or trays, as described above, and are added to the growing tanks or larvae tanks at a density of one to two larvae per milliliter, or approximately one to two million larvae per 1,000 liter tank. A density as high as five larvae per milliliter is acceptable, but this appears to be an upper limit.

Although the process of the invention is subject to certain latitudes in temperature control, animal density, and the like, a preferred process in accordance with the invention for optimizing the incubation and hatching of abalone eggs and the development of the resultant larvae comprises the following stepwise procedure:

1. Separating fertilized eggs from the water in which fertilization took place, by multiple two-stage filtration in which the eggs are first retained in an approximately 100 micron filter and subsequently washed in sterilized water, and then passed through a 300 micron filter, which two-stage process is repeated a number of times to enable the eggs to be cleaned and incubated in a reduced bacteria count environment;

2. Placing the cleaned eggs in a body of seawater which has been highly filtered and exposed to ultraviolet light and which may be quiescent in shallow trays or gently circulating in an incubation tank of the type described herein;

3. Maintaining the incubation water at a constant temperature approximately equal to the highest temperature that the particular species of abalone encounters in its indigenous habitat, which, in the case of the California *Haliotis rufescens* at preferably 18° C., while maintaining the dissolved oxygen concentration in the water above about 75% of saturation at the controlled temperature and preferably close to or at saturation levels;

4. Selectively transferring the hatched larvae, substantially free of hatching debris, to a second body of seawater which has been filtered through a 25 micron filter; and 5. Maintaining the second body of seawater at essentially the same constant temperature as the hatching bath while periodically removing detritus which settles to the bottom of the bath, and maintaining the ammonia content in the bath at less than about 100 parts per billion.

If the procedures of this invention are followed, it is possible to obtain a hatch of up to 90% of the fertilized eggs transferred from the hatching trays or tanks to the larvae tank, and often a survival of as much as 90% of the larvae in the larvae growing tank, which percentage survival is far higher than that occurring in natural surroundings and is more than adequate to support economic abalone mariculture through further growing stages.

What is claimed is:

1. A process for incubating abalone eggs which have been spawned and fertilized in a first confined body of seawater and growing the hatched larvae, which comprises the steps of:
    (a) separating the fertilized eggs from the first body of seawater;
    (b) cleaning the eggs to separate contaminating organic matter therefrom;
    (c) placing the cleaned eggs in a second body of purified seawater for the period necessary for incubation and hatching and while holding the second body of seawater at substantially constant temperature;
    (d) selectively transferring the resultant larvae substantially free of hatching debris to a third body of seawater; and
    (e) holding the larvae in the third body of seawater until they are ready to metamorphose to a crawling animal while maintaining the third body of water at a constant temperature.

2. A process according to claim 1 in which the second and third body of seawater are held at a substantially constant temperature between about 16° and 18° C.

3. A process according to claim 1 in which the oxygen content of the second body of seawater is maintained above about 75% of saturation.

4. A process according to claim 1 in which air is circulated in the second body of seawater to maintain the eggs in suspension therein until just prior to the separation of the hatched larvae from the egg case.

5. A process in accordance with claim 1 in which the fertilized eggs are separated from the first body of seawater by repetitive two-stage filtration in the first stage of which the eggs are retained on a filter of approximately 100 micron size, are thereafter washed in sterilized water and then passed through a second filter of approximately 300 micron size, which two-stage filtration process is repeated a number of times to insure that the eggs will thereafter be incubated in a minimal bacteria count environment.

6. A process in accordance with claim 1 in which the second body of seawater comprises seawater which has been passed through a two-micron filter and subjected to ultraviolet sterilization to reduce the bacteria count thereof to not more than about 100 cells per milliliter.

7. A process in accordance with claim 1 in which the ammonia concentration in the third body of seawater is maintained at less than about 100 parts per billion.

8. A process for incubating abalone eggs which have been spawned and fertilized in a first confined body of seawater, which comprises the steps of:
    (a) separating the fertilized eggs from the first body of seawater;
    (b) cleaning the eggs to separate contaminating organic matter therefrom; and
    (c) placing the cleaned eggs in a second body of purified seawater for the period necessary for incubation and hatching and while holding the second body of seawater at substantially constant temperature.

9. A process in accordance with claim 8 in which the second body of seawater is maintained at a substantially constant temperature between about 16° and 18° C.

10. A process in accordance with claim 8 in which the oxygen concentration of the second body of seawater is maintained above about 75% of saturation.

11. A process in accordance with claim 8 in which air is circulated gently through the second body of seawater to maintain the eggs in suspension therein and such air circulation is discontinued approximately two hours prior to the separation of hatched larvae from the eggs.

12. A process in accordance with claim 8 in which the second body of seawater has been filtered and sterilized to reduce the bacteria count thereof to less than about 100 cells per millilter.

13. A process for culturing larvae hatched in a first body of seawater from abalone eggs suspended therein, which comprises the steps of:
    (a) selectively transferring larvae substantially free of hatching debris from the first body of seawater to a second body of seawater;
    (b) holding the larvae in the second body of seawater until they are ready to metamorphose to a crawling animal while maintaining the second body of seawater at a constant temperature; and
    (c) maintaining the ammonia content of the second body of seawater at less than about 100 parts per billion.

14. The process for culturing larvae hatched in a first body of seawater from abalone eggs suspended therein, which comprises the steps of:
    (a) selectively transferring larvae substantially free of hatching debris from the first body of seawater to a second body of seawater which consists of ocean water which has been filtered through an approximately 25 micron filter and has not been otherwise sterilized; and
    (b) holding the larvae in the second body of seawater until they are ready to metamorphose to a crawling animal while maintaining the second body of seawater at a constant temperature.

15. A process for incubating abalone eggs which have been spawned and fertilized in a first confined body of seawater, which comprises the steps of:
    (a) separating the fertilized eggs from the first body of seawater;
    (b) cleaning the eggs to separate contaminating organic matter therefrom; and
    (c) placing the cleaned eggs at a density of not to exceed about ten eggs per milliliter of water in a second quiescent body of purified seawater for the period necessary for incubation and hatching and while holding the second body of seawater at a substantially constant temperature.

16. A process for incubating abalone eggs which have been spawned and fertilized in a first confined body of seawater, which comprises the steps of:
    (a) separating the fertilized eggs from the first body of seawater;
    (b) cleaning the eggs to separate contaminating organic matter therefrom;
    (c) placing the cleaned eggs at a density of not to exceed about thirty-five eggs per milliliter of water in a second body of purified seawater for the period necessary for incubation and hatching and while holding the second body of seawater at substantially constant temperature; and
    (d) agitating the second body of seawater to keep the eggs suspended therein.

* * * * *